Patented June 12, 1951

2,556,898

UNITED STATES PATENT OFFICE 2,556,898

UREA-FORMALDEHYDE-SULPHOXYLATE RESIN FOR HIGH WET-STRENGTH PAPER

Alfred Brookes and Frederick Lyth Hudson, London, England, assignors, by mesne assignments, to American Cyanamid Company, New York, N. Y., a corporation of Maine No Drawing. Application December 16, 1946, Serial No. 716,672. In Great Britain December 21, 1945

12 Claims. (Cl. 92—21)

1

This invention relates to improvements in the manufacture of resinous condensation products of urea and formaldehyde, and particularly to the manufacture of condensation products which are of value in paper making processes.

According to this invention, resinous condensation products of urea and formaldehyde which are capable of being fixed or adsorbed by paper pulp in dilute suspensions and are of value as additions in the beater stage of paper making for imparting wet strength to paper are manufactured by condensing urea and formaldehyde together in the presence or with the addition of a water-soluble sulphoxylate, or of a salt which generates or is converted to a sulphoxylate by reaction with aldehydes.

The condensation generally is effected with the aid of heat. Acid or alkaline condensation agents may be added if desired.

A preferred procedure is to heat the urea, formalin and the sulphoxylate together. The addition of the sulphoxylate may be made, however, at any convenient stage during the reaction of the urea with formaldehyde. It is possible for instance to submit the urea and formalin to a preliminary heating, preferably under neutral or mildly alkaline conditions, then add the sulphoxylate and continue the condensation process with further heating if necessary, if desired with the addition of acidic condensation agents. Alternatively, a solution containing the urea and sulphoxylate may be fed continuously into heated formalin and the reaction continued, with further heating if necessary. As a further alternative, a urea solution may be fed into a heated solution of sulphoxylate in formalin. In any case, condensation agents such as acids or alkalis may be added to either of these separate starting solutions, or both.

The proportion of formaldehyde to be used may vary from 1.5 to 3 mols per mol urea. A preferred proportion is 2 mols formaldehyde per mol. urea and when a lower ratio is used it is sometimes advantageous to conduct the condensation reaction of the urea, sulphoxylate and formalin at an initial ratio of 2 or more mols, formaldehyde per mol. urea and add the balance of the urea at a later stage of the process.

Proportions as low as 2% by weight of the sulphoxylate may be employed calculated on the weight of urea. The proportion of sulphoxylate

2 may be increased to any desired extent, but in general no advantage appears to accrue when the weight of sulphoxylate exceeds 50% of the weight of urea employed in the reaction.

The sulphoxylates may be reacted or combined with aldehydes prior to their use as modifying agents in the condensation of urea and formaldehyde according to the process of the invention, and the aldehyde-addition compounds of sulphoxylates, such for instance as sodium formaldehyde sulphoxylate which is readily available commercially, are convenient starting materials for the process.

We have found that the efficiency of sulphoxylates as modifying agents exceeds that of the corresponding bisulphites. Nevertheless, in addition to the sulphoxylate used as above described there may be present in any desired proportion the bisulphite compounds described in British specification No. 14434/45. Accordingly mixtures of sulphoxylate and bisulphite, or of their addition compounds with aldehydes, may be used as starting materials.

Alternatively there may be used as modifying agent a hydrosulphite such as sodium hydrosulphite $Na_2S_2O_4$ which by reaction with aldehyde is resolved into a mixture of sodium bisulphite and sodium sulphoxylate in combination with the aldehyde. In this case a mixture of sodium formaldehyde sulphoxylate and sodium formaldehyde bisulphite is generated by reaction with formalin prior to or during the process of condensation with urea, and these substances serve to modify the properties of the resin in the desired manner.

Examples of suitable modifying agents for use in the process of the invention are sodium formaldehyde sulphoxylate, $NaHSO_2.CH_2O$, sodium ethyl sulphoxylate $Na(C_2H_5)SO_2$, sodium benzaldehyde sulphoxylate, sodium hydrosulphite (or hyposulphite) $Na_2S_2O_4$, magnesium hydrosulphite $MgS_2O_4$.

The condensation products may be used in conjunction with the usual sizing agents and loading substances commonly employed in paper making, e. g. resin, alum, kaolin, terra alba, casein, gelatine, starches, alginates and the like. Particularly in conjunction with alum the sulphoxylate-modified resins of this invention have been found to give especially good results.

Condensation products prepared according to the process of the invention are effective in improving the wet strength of paper when added to a paper-pulp suspension in water in proportions as low as 0.5% by weight of an aqueous solution of the condensation product prepared substantially as described in the examples given below based on the dry weight of cellulosic stock. The condensation product may be added to the pulp at any convenient point during the beater stages of paper-making, for instance during the beating process, or to the suspension of the beaten pulp prior to or during sheet formation on the paper machine. The proportion of the condensation product which may be used may be increased to any desired extent, but in general there appears to be no practical or economic advantage with proportions greater than 25%.

The resinous solutions may be added directly to the pulp suspension or they may be further diluted with alcohol, water, formalin or aqueous solvents before use. Where it is desired to store the condensation product before use in paper making processes it is generally advantageous to stabilise the product at the end of the condensation reaction by adjusting the reaction of the condensation solution approximately to neutrality or even to a slight degree of alkalinity. This is of particular importance when acidic condensation agents are used, since if an acid reaction is allowed to remain the resinous solutions tend speedily to set to insoluble and unusable jellies. By neutralising any free acidity the solutions may be stored for considerable lengths of time. It is of further advantage to add to the solutions intended for storage small proportions of mildly alkaline agents such as borax, sodium bicarbonate, or triethanolamine to act as buffers against the development of acidity which may arise, for instance from atmospheric oxidation in the case of open or imperfectly sealed containers. If desired, solutions which have been neutralised and stabilised at the end of the condensation process may be concentrated by evaporation, or dried to yield solid products that may subsequently be redissolved or redispersed in water or formalin or other liquid media for use in paper making processes. Proportions within the range of 0.25% to 10% of the solid condensation product so obtained, based on the dry weight of cellulosic stock, are particularly advantageous for increasing the wet strength of paper.

The condensation product adsorbed or retained by the paper pulp is cured or converted to its insoluble condition by heat. This conversion can be brought about during travel of the paper over drying cylinders as in ordinary paper-making technique. The speed and extent of the conversion may be augmented if desired by addition of accelerators comprising acidic substances. These may conveniently be added alongside, before or after the addition of the condensation product to the pulp suspension. Aluminum sulphate or paper makers' alum is a particularly advantageous agent for this purpose, assisting both in fixation of the resin on the fibre and cure of the resin in drying. Supplementary heating processes, such as supercalendering under heat, may be employed if desired. Conversion of the resin may also be accelerated by submitting the resin-treated paper to the action of acidic vapours, or by any of the devices well known in the arts whereby curing of the resin is achieved by the action of acid accelerators under heat.

Examples of the preparation and use of condensation products according to the invention are as follows, the parts being by weight:

*Example 1.*—A solution of 15 parts sodium formaldehyde sulphoxylate in 156 parts commercial formalin containing 56.6 parts $CH_2O$ was adjusted to pH 8.5 by the addition of 0.04 part sulphuric acid. 60 parts urea were dissolved therein and the solution boiled under a reflux condenser. 0.6 part sulphuric acid at approximately 3N. concentration was added as condensation agent to the boiling solution and the reaction supported by boiling for a total of 3½ hours, whereupon the resin solution was neutralised by addition of caustic soda solution and cooled.

*Example 2.*—A solution of 60 parts urea and 0.3 part disodium hydrogen phosphate in 166 parts neutral formalin containing 60 parts $CH_2O$ was heated under a reflux condenser and after boiling for 30 minutes a solution of 15 parts sodium formaldehyde sulphoxylate in 20 parts hot water was fed in, followed by a solution of 0.6 part sulphuric acid in 5 parts water. Boiling was continued throughout and for a total of 3 hours whereupon the resin solution was neutralised by the addition of caustic soda solution and cooled.

*Example 3.*—166 parts commercial formalin containing 60 parts $CH_2O$, 12.5 parts commercial sodium hydrosulphite $Na_2S_2O_4$ and 60 parts urea were heated together under reflux condenser and after boiling for 30 minutes 0.35 part sulphuric acid diluted with about 5 parts water was added as condensation agent. The reaction was continued at boiling point for 1½ hours whereupon the resin solution was neutralised with caustic soda solution and cooled.

*Example 4.*—A solution of 15 parts sodium formaldehyde sulphoxylate and 60 parts urea in 156 parts commercial formalin was tested and found to have pH value 9.2. The solution was boiled under reflux condenser when the pH value fell rapidly to 7.3 and thereafter remained approximately constant. After boiling for 22 hours a viscous resin syrup was obtained which remained clear on cooling and with the addition of 1 part sodium bicarbonate remained stable for several weeks in storage.

*Example 5.*—A solution of 15 parts sodium formaldehyde sulphoxylate and 60 parts urea in 156 parts commercial formalin was heated to boiling under reflux condenser as in Example 4. After boiling for 30 minutes a solution of 3 parts $H_2SO_4$ in 10 parts water was added bringing the pH value of the solution below 4, and of the order of 3–3.3 and boiling was continued for a further 12 minutes, giving a viscous solution which was then neutralised by addition of caustic soda solution and cooled. 1 part sodium bicarbonate was dissolved in the solution to act as buffer against development of acidity in storage.

*Example 6.*—A solution of 29 parts sodium formaldehyde sulphoxylate in 146 parts commercial formalin was adjusted to pH 8.5 by the addition of 0.1 part sulphuric acid. 60 parts urea were added and the solution boiled under a reflux condenser for half an hour. 0.6 part sulphuric acid in about 5 parts water was added, reducing the pH to 5.3 and the solution was boiled for five hours, then neutralised with caustic soda and cooled.

*Example 7.*—A solution of 15 parts sodium formaldehyde sulphoxylate in 156 parts of commercial formalin was acidified with 0.85 part of sulphuric acid, which reduced the pH to 4.1, and boiled under a reflux condenser. 60 parts urea, dissolved with warming in 60 parts water were fed into the boiling solution, taking 30 minutes for the addition. The mixture was boiled for a further three hours, neutralised with caustic soda solution, cooled and buffered by the addition of one part of sodium bicarbonate.

*Example 8.*—156 parts commercial formalin acidified with 0.85 part sulphuric acid was found to have a pH of 1.3. The mixture was heated to boiling under a reflux condenser and a solution comprising 15 parts sodium formaldehyde sulphoxylate and 60 parts urea dissolved with the aid of heat in 60 parts water was fed into the boiling formalin over a period of 20 minutes. The reaction was supported by boiling for a further 2½ hours and the mixture was then neutralised with caustic soda, cooled and buffered with one part sodium bicarbonate.

*Example 9.*—A solution of 13 parts commercial sodium hydrosulphite in 166 parts commercial formalin, containing 60 parts $CH_2O$, was acidified with 0.5 part sulphuric acid in dilute solution giving a pH of 4.2. This solution was heated to boiling under a reflux condenser and 60 parts urea, dissolved in 60 parts water, run into the boiling mixture over a period of 30 minutes. The urea addition raised the pH to 4.8. After boiling for a further three hours the solution was neutralised with caustic soda solution and buffered, after cooling, by the addition of one part sodium bicarbonate.

*Example 10.*—166 parts commercial formalin acidified with 0.5 part of sulphuric acid, was found to have a pH of 1.5. The mixture was heated to boiling under a reflux condenser and a solution fed slowly into it, consisting of 13 parts sodium hydrosulphite and 60 parts urea dissolved, with warming, in 60 parts water. This solution was protected from atmospheric oxidation during preparation and use by floating on its surface a layer of white spirit. The addition of this solution, which was completed in 20 minutes, raised the pH to about 5.0. The condensation solution was boiled for a further three hours and the mixture was then neutralised with caustic soda and buffered, after cooling, with one part sodium bicarbonate.

The resins made according to the foregoing examples were tested as additions to paper pulp suspensions by making paper sheets in the laboratory using a small hand mould.

Bleached sulphite wood pulp was beaten in a laboratory beater to a wetness of about 40° Schopper-Riegler.

The resins were mixed into successive portions of pulp in the proportion of about 5% resin solids on bone dry pulp. For this purpose all the urea, formaldehyde and salts used in the preparation are regarded as resin solids. After the resin sufficient alum was added to reduce the pH of the pulp suspension to 4.5.

Hand made sheets of paper prepared from the resin treated pulps, after drying under heat in the normal manner, were found to retain considerable strength after saturation with water. The dry strength is also improved.

Portions of the papers were analysed and the amount of resin retained expressed as percentage of the total resin added was found to be as follows:

| Sample No. | 1 | 2 | 3 | 4 | 5 | 6 | 7 |
|---|---|---|---|---|---|---|---|
| Per Cent Resin retained | 39 | 24 | 26 | 33 | 29 | 28 | 26 |

Further tests were made using moderately beaten kraft pulp with addition of resin and alum to pH 4.5 for ordinary engine sizing. To successive portions of this pulp condensation products prepared as in the foregoing examples were added after the other ingredients and hand sheets made as soon as possible after the resin addition.

Sheets were made within a minute of the resin addition, using 2½% resin solids on pulp and the following results were obtained on sheets which were thoroughly dried on a laboratory steam heated cylinder. The wet tensile strength is expressed as a percentage of the dry strength while the resin retained was obtained by analysis and is expressed as a percentage of the total resin added.

| Sample No. | 1 | 3 | 5 | Untreated pulp | 8 | 9 | 10 |
|---|---|---|---|---|---|---|---|
| Per Cent Resin retained | 44 | 41 | 40 | | 35 | 36 | 34 |
| Wet Strength Per Cent of Dry Strength | 30 | 27 | 24 | 9–13 | 27 | 28 | 29 |

What we claim is:

1. Process for the manufacture of resinous condensation products of urea and formaldehyde by condensing urea and formaldehyde together in the presence of a water-soluble sulphoxylate.

2. Process as claimed in claim 1 in which the sulphoxylate is added as such.

3. Process as claimed in claim 1 in which a salt is added which is reactable with aldehydes to produce the sulphoxylate.

4. Process as claimed in claim 1 in which a urea solution is fed into a heated solution of sulphoxylate in formalin.

5. Process as claimed in claim 1 in which the proportion of formaldehyde to urea is from 1.5 to 3 mols of the former per mol of the latter, the condensation reaction being initiated with a part of the urea to be used, the remainder being added subsequently.

6. Process as claimed in claim 1 in which there is employed a sulphoxylate which is reacted with an aldehyde before being used in the condensation process.

7. Process as claimed in claim 1 in which there is present in the course of the condensation a bisulphite in addition to the sulphoxylate.

8. Process as claimed in claim 1 in which there is present a mixture of sodium formaldehyde sulphoxylate and sodium formaldehyde bisulphite produced by reaction of sodium hydrosulphite with formaldehyde.

9. Process as claimed in claim 1 in which there is present a mixture of sodium formaldehyde sulphoxylate and sodium formaldehyde bisulphite produced during the condensation reaction by introducing sodium hydrosulphite so that it reacts with formaldehyde which is present.

10. Resinous urea-formaldehyde condensation products produced by condensing urea and formaldehyde together in the presence of a water-soluble sulphoxylate.

11. Process for the manufacture of resinous condensation products of urea and formaldehyde useful in beater-sizing of paper pulp suspensions for improving the wet strength of paper which comprises heating urea and formaldehyde together in the mol ratio of 1 to 1.5–3 in aqueous solution in the presence of a water-soluble sulphoxylate in an amount of from 2% to 50% on the weight of the urea.

12. High wet strength paper sized with from 0.25 to 25% by weight of a water-soluble sulphoxylated condensed condensation product of urea and formaldehyde in the ratio of 1 mol urea to 1.5–3 mols formaldehyde.

ALFRED BROOKES.
FREDERICK LYTH HUDSON.

REFERENCES CITED

The following references are of record in the file of this patent:

UNITED STATES PATENTS

| Number | Name | Date |
|---|---|---|
| 2,320,301 | Powers | May 25, 1943 |
| 2,325,302 | Britt | July 27, 1943 |
| 2,338,602 | Schur | Jan. 4, 1944 |
| 2,345,543 | Wohnsiedler et al. | Mar. 28, 1944 |
| 2,407,376 | Maxwell | Sept. 10, 1946 |